Figure 1:
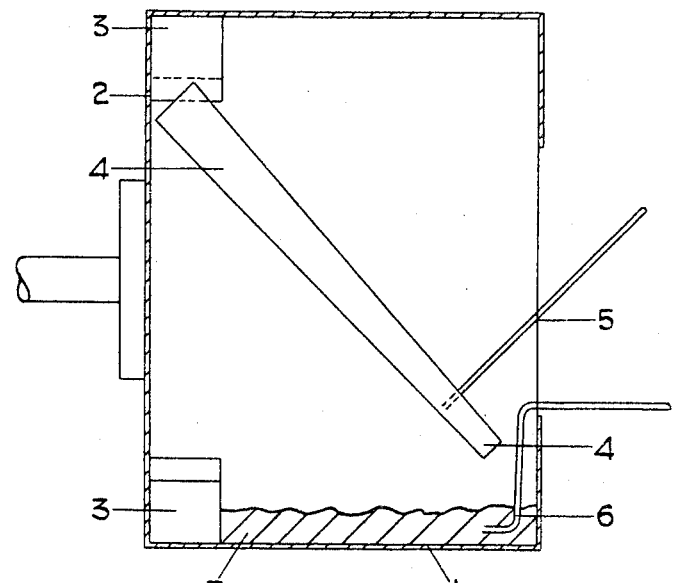

March 15, 1966  F. J. HARRIS  3,240,586
MANUFACTURE OF MULTI-LAYERED GRANULAR FERTILIZERS
Filed June 23, 1964

INVENTOR
FREDERICK JOHN HARRIS

BY Cushman, Darby & Cushman
ATTORNEYS

United States Patent Office 3,240,586
Patented Mar. 15, 1966

3,240,586
MANUFACTURE OF MULTI-LAYERED
GRANULAR FERTILIZERS
Frederick J. Harris, Edinburgh, Scotland, assignor to Scottish Agricultural Industries Limited, Edinburgh, Scotland, a corporation of Great Britain
Filed June 23, 1964, Ser. No. 377,368
Claims priority, application Great Britain, Nov. 14, 1960, 38,993/60; Mar. 22, 1961, 10,454/61
6 Claims. (Cl. 71—39)

This application is a continuation-in-part of my copending application Serial No. 152,265, filed on November 14, 1961, now abandoned, for manufacture of granular fertilisers.

The invention relates to a process for the manufacture of granular fertilisers containing one or more ammonium salts and to the granular fertilisers obtained thereby.

Fertilisers are compositions of matter which contain one or more of the three elements essential to plant nutrition, nitrogen, phosphorus, and potassium; commonly expressed as N, $P_2O_5$ and $K_2O$. Ammonium salts, because of their nitrogen content, are common fertiliser ingredients; examples of these are ammonium sulphate, ammonium nitrate and ammonium phosphate; the last of these also supplies $P_2O_5$.

Ammonium salts used in fertilisers have usually been manufactured at some stage by the reaction of ammonia with a mineral acid. This is a strongly exothermic reaction, and it is desirable to make use of this heat if possible. The most economic way to do this is to cause the reaction to take place in situ during the manufacture of the fertiliser. This is generally termed "ammoniation."

Ammoniation has been used in fertiliser manufacturing processes to give a semi-dry or dry granular product, but the granulation stage involved has been essentially one of agglomeration. In such a combined ammoniation-granulation operation, dry fertiliser salt particles are wetted with a mineral acid and rolled, shaken or agitated until they agglomerate into granules. Ammonia is injected into the bed to form ammonium salts corresponding to the acid or acids present. Although the heat evolved in this reaction will partially dry the product, it is not enough to give a "dry" product. In this specification, as in my aforementioned copending application, the term "dry" is used to describe a product, the moisture content of which is below the level, usually ~0.5%. $H_2O$, but dependent upon the composition, at which caking in storage is a serious hazard. Drying by the heat of ammoniation is incomplete because a relatively large amount of water (usually ~10%) must be present in the solids in order to cause agglomeration and also because the water introduced is distributed thereby throughout each granule and does not remain on the surface as an easily evaporated layer. Moreover this type of granulation, which depends upon a liquid phase being present, is unsuitable for heat sensitive compositions, especially if any very soluble salts such as ammonium nitrate are present, because a relatively small rise in temperature can cause the formation of oversize and granulation is difficult to control. Another hazard associated with uneven distribution of heat is "flash fires" which may occur particularly if ammonium nitrate or nitric acid is present.

Another method of manufacturing granular fertilisers containing ammonium salts, especially ammonium phosphates, is by a "layering" process. Preformed granules are passed through a paddle mixer, pug mill or blunger in which they are coated with a solution or slurry containing the ammonium salt. The coated granules are dried in a drier, a portion of the desired sized dry granules is taken out of the system as product, and the rest are returned to the form of granulator used. The product granules thus formed have an "onion skin" structure. A disadvantage of this process is that the heat of formation of the ammonium salt is not used in the production of a dry product and external heat has to be applied to give non-caking granules. Moreover because all the material in the plant has to be recycled through the granulating, drying and screening operations the whole recycle load materialwise and thermalwise, is placed on all the pieces of equipment required for those operations.

In the said copending application it is stated that the recirculation process of the invention which is described therein permits the production of substantially dry granular fertilisers containing one or more ammonium salts without external heating and without subsequent drying.

According to the present invention the continuous process for the production of a multi-layered granular ammonium salt fertiliser comprising providing quantities of ammonia and at least one acid selected from the group consisting of phosphoric acid, sulphuric acid and nitric acid, reacting said quantities of ammonia and acid on granules comprising ammonium salt in a localized region of a reaction chamber while maintaining the moisture content of said granules therein at a level below about 1% thereby forming a layer of ammonium salt on each of said granules, withdrawing all of said granules from said localized region of said reaction chamber and transferring same to a second region in said reaction chamber remote from said localized region, removing a portion of said granules from said second region of said reaction chamber and in an amount greater than the amount of the acid and ammonia being added to said localized region of said chamber and then sizing said removed granules to desired product size range, recirculating the remainder of said granules from said second region and from said sizing operation to said localized region inside the chamber while maintaining the moisture content of the recirculating granules at a level below 1%, the ratio of the rate of recirculation to the rate of removal being at least 20:1, reacting in said localized region said recirculated granules with an additional quantity of ammonia and acid while continuing to maintain the moisture content of said granules in said localized region at a level below 1% thereby forming a further layer of ammonium salt thereon, and repeating said removal, sizing and recirculation cycle to obtain a multi-layer granular ammonium salt fertiliser as the end product.

Preferably the moisture content of the granules in said localized region is at least 0.1% less than that at which the granules tend to lose their discrete identities at the temperature of said moving granules.

The rate of addition of the ammonia and acid is controlled relative to the recirculation rate of the moving granules. Furthermore, the ratio, termed, for convenience, the recycle ratio, of the rate of recirculation of the granules within the reaction chamber to the rate of removal of the granular product from said chamber is preferably for large scale operations at least 60:1.

The recirculating granules may be treated with the reactants in three ways. Firstly, and this is the preferred way, the acid or acids are added to granules of product composition in the localized region, and these acidified granules then ammoniated in said localized region. Secondly, the points of addition of the reactants in said localized region are substantially coincident. Thirdly, the ammonia is added to granules of product composition in the localized region and these ammonia-laden granules are then subsequently acidified in this localized region.

In accordance with a modification of the process of the invention the granules can be treated with acid/or ammonia in more than one localized region and the granular product removed from a region remote from these localized regions.

The process of the invention is preferably effected in a reactor rotating about a substantially horizontal axis and having means to effect during its rotation internal recirculation of granules from one end portion of the reactor to the other. In such a reactor the granules are internally recirculated by removing them from one part of a moving bed of granules and transferring them to another part of the same bed if the reactor comprises a single drum or to another bed from which they are returned to the former bed if the reactor comprises two rotation drums concentrically mounted one within the other. In any such reactor the granules are preferably wetted with acid during the transfer, this region of transfer being one localized region, and, as a further preferred feature, the ammonia is introduced into that part, this being a second localized region, of the bed to which the acidified granules are transferred.

Clearly, to obtain dry granules the concentration of the acid or the mixture of acids used must be such that the amount of water introduced thereby is no more than that which can be adequately evaporated by the heat evolved in the reaction of the ammonia and acid or acids. However, if two acids are added at different points, it is only necessary to balance the total water introduced against the total heat of reaction available. In other words, under stable operating conditions the moisture content at any one given point in the recirculating bed will not vary to any appreciable extent.

Unless very concentrated acids are used, substantially anhydrous ammonia is preferred for this process. However, aqueous ammonia solution may be used so long as the total water introduced into the reactor is less than that which can be adequately evaporated by the heat of reaction.

Any other fertiliser salt or additive, as for example, urea, potassium salts or phosphates, to give the desired composition may be added to the bed. Moreover, other substances as for example, pesticides or fungicides, can be incorporated at this stage so long as they are stable under the reaction conditions.

Some of the formulations, especially those based on ammonium nitrate, are heat sensitive and tend to become too plastic for good granulation if the bed temperature is too high. The bed temperature is controlled by the rate of reactant addition, by the concentration of acid used, or if desired, additionally externally as, for example, by blowing cold air over the bed.

In order to make efficient use of the heat of reaction, the stream of granules if preferably recirculated internally within a single reactor. There are several types of reactors in which this may be achieved.

The following description relates to the accompanying diagrammatic drawings. These illustrate by way of example two forms of apparatus which may be used. In the diagrammatic drawings FIGURE 1 illustrates a single drum apparatus and FIGURE 2 illustrates a double drum apparatus.

Figure 2:
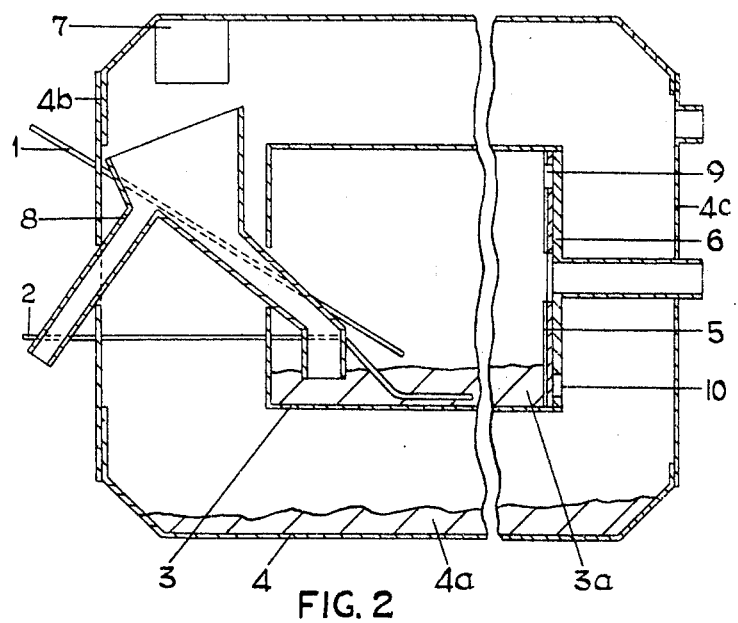

As illustrated in FIGURE 1 of the drawing, a single drum 1, of some 2 feet diameter and 1½ feet long is closed at one end 2, wherein there is internal array of lifting buckets 3. Within the drum and inclined down from the closed end 2, towards the open end of the drum is a chute 4, into which near its bottom end discharges a pipe 5, coming through the open end of the drum. A second pipe 6, discharges into the drum below the bottom of the chute 4.

In operation, when the drum 1, containing a bed of granules 7, is rotated the granules move from the open end to the closed end of the drum, where they are picked up by the buckets 3, and discharged down the chute 4, to the open end of the drum again. Acid is added through the pipe 5, and gaseous ammonia is fed in through pipe 6, below the bed of acidified granules.

At given intervals an amount of the bed of granules in the drum is removed by a hand scoop. Product equivalent in amount to that produced by the added acid and ammonia, and of desired product size range, is obtained from a sizing operation. The fines together with the crushed oversize from the sizing operation are returned to the drum.

Alternatively, the acid and ammonia pipes may be concentrically arranged to discharge into the bed of recirculating granules at the base of the chute: this is not illustrated in FIGURE 1.

As illustrated in FIGURE 2, another reactor comprises two drums, one drum 3, mounted inside another drum 4, having stationary end plates 4b and 4c. Each contains a bed of preformed granules 3a, and 4a respectively. On rotation of the unit the granules pass along the inner drum 4, through intermittently coincident holes 9 and 10 in the end plate 5, of the inner drum and the stationary baffle plate 6, pass along the outer drum 4, are picked up by buckets 7, and discharged down a bifurcated chute 8, into the inner drum 3. Acid is introduced into the inner drum 3, through pipe 1, and gaseous ammonia into a lower but adjacent point through pipe 2.

Returning to a description of the process, as the layer of acid put on to each granule is relatively thin, the rate of ammoniation and hence drying is rapid. However, the rate of recirculation must not be so great that the acid layer on the recirculated granules is not reacted and dried before the granules are wetted againg by the acid. On the other hand a high rate of recirculation is desirable because the ratio of the rate of acid addition to the rate of recirculation of solids is also a limiting factor. If too much acid is added in proportion to the recirculating granules, they will lose their discrete identities and agglomerate into oversize. I have found that this undesirable state of affairs comes about if the granule moisture content in the localized region of reactant addition exceeds about 1%, depending on the composition of the granules. The moisture content is maintained at or below this figure by controlling the rate of addition of reactants relative to the recirculation rate. Moreover, the moisture content of the bed of granules immediately prior to the acid and ammonia treatment is not allowed to rise substantially during the proces, otherwise the cumulative effect of slight increases in moisture content at each cycle would eventually cause the granules to become to moist and their moisture would exceed the limit above which they cease to be free flowing. Nowhere in the granulating bed does the moisture content exceed about 1% (as compared with about 10% as is used in the agglomeration process hereinbefore mentioned).

In order to maintain stable running conditions a proportion of the bed is removed and an amount which is equivalent to that produced by the fertiliser raw materials added to the bed and which is in the desired product size range, is screened out. Any oversize is cracked and screened if desired. The non-product size together with the fines are returned to the reactor to provide new nuclei for granulation according to the process of the invention. Additionally, under some conditions new nuclei for granulation according to the invention are formed, for example, by the mutual breaking of granules in the granule bed.

It will be understood that the quantity of granules continuously being removed for sizing from the recirculating stream of granules in the reaction chamber is small in proportion to the quantity remaining in the chamber and so the return of the sized fines and crushed oversize granules from the quantity removed has substantially no effect on the moisture content of the recirculating stream of granules. Also, because usually these fines and crushed oversize granules, on their return, contain less moisture than the same weight of product removed for sizing their return to the recirculating stream of granules within the chamber makes it easier to control the moisture content of this stream than if the fines and crushed oversize had their original moisture content.

The process which is the subject of this invention has an important advantage over agglomeration processes in that it obviates the necessity of using separate units for the ammoniating, granulating and drying operations in order to prepare high quality granular fertiliser of sufficiently low moisture content as to be non-caking.

Moreover, although the three operations of ammoniation, granulation and drying, are combined in one in this invention, nevertheless, the degree of granulation and drying are very easily controlled, e.g. by altering the feed rate or the concentration of the acid.

Another advantage is that, because the granulation does not directly depend upon the liquid present, as in an agglomeraton process, the possibility of the formation of excessive oversize by the accretion of granules is considerably reduced.

If it is desired to obtain a very dry product by the process of the invention, it may be necessary to use a supplementary drier, but this drier need only be of minimum capacity because it handles only the output of product size material.

The process of the invention has been found to be particularly suitable for the manufacture of granular ammonium phosphates from wet process phosphoric acid and gaseous ammonia.

Moreover, if it is desired to prepare a granular product containing diammonium phosphate, this can be achieved with relatively small waste of ammonia. Diammonium phosphate decomposition is reduced to a minimum by the process of the invention to cause the heat and amount of carrier gas used therein can be carefully controlled to be the minimum necessary to evaporate and remove water introduced by the reactants; moreover, the heat evolved can be generated evenly and localized "hot-spots," which are often the cause of diammonium phosphate decomposition, can be avoided.

The process of the invention can also be used for the production of granular fertilisers containing ammonium nitrate where the even and controlled supply of heat is very important because of the heat-sensitive nature of ammonium nitrate and the possibility of the occurrence of "flash-fires." Ammonium nitrate compositions are difficult to granulate because with relatively small temperature rises they become very plastic due to the formation of large amounts of liquid phase; this causes over-granulation and build-up in the manufacturing equipment. In addition, by using nitric acid and ammonia as raw materials instead of ammonium nitrate, storage difficulties connected with the latter are overcome. Ammonium nitrate, present only in the fertiliser product, is less hazardous because it is then diluted with other salts.

The following examples are illustrative of the process, but are in no way limiting.

A typical screen analysis of the beds of preformed granules to undergo recirculation in the specified reaction chamber in the following examples is as follows:

| B.S. sieve: | Percent weight in 100 grams of granules |
|---|---|
| <5 | 0 |
| 5–7 | 3 |
| 7–10 | 30 |
| 10–12 | 37 |
| 12–16 | 10 |
| 16–30 | 20 |
| >30 | 1 |

The product usually required is that which passes a 5 and is retained by a 12 mesh B.S. sieve. This means that the required product has a size range of 1.40 to 3.36 mm. The material which is left on the 5 mesh screen is crushed through crackers to fines and these fines are returned to the granulator. The material which passes the 12, 16, 30 and >30 mesh screens is also returned to the granulator.

The rate of recirculation of the granular bed can be determined in several ways. For instance, coloured granules can be added at a certain spot to a known weight of granules in the rotating granulator and the following procedure followed. From the said spot of addition of the coloured granules samples are taken after a minute and then at intervals after every 15 seconds. 200 grams are taken from each of these samples and the number of coloured granules counted in each 200 grams. The number of coloured granules is plotted against time.

It may be found, for instance, that after the first minute there are no coloured granules, after 1½ minutes there are a few, after 2 minutes a greater number and after 2½ minutes a peak number. After this the number falls and then again there is a peak after 5 minutes. The recirculation time is therefore 2½ minutes and the recirculation rate per hours is 60/2½ × weight of bed in the granulator.

*Example 1*

Granular fertiliser-grade monoammonium phosphate ($N:P=0.97$) can be made as follows in the rotating drum illustrated in FIGURE 1 hereinbefore described. Said drum is of 2 ft. diameter, 18 in. long and rotates at 15 r.p.m. Wet-process phosphoric acid is added through pipe 5 on to a bed of circulating granules of monoammonium phosphate. The thus formed acid-coated granules are reacted with gaseous ammonia fed through pipe 6 at the rate necessary to ammoniate the acid to monoammonium phosphate ($N:P=0.97$). The rotation of the drum carries the ammoniated granules to the closed end of the drum where they are picked up by six lifting buckets 3, each of ¾–1 lb. total discharge capacity. The granules are discharged down the chute 4 to the open end of the drum where they are again acidified.

At given intervals an amount of the bed of granules in the drum is removed by a hand scoop. Product in the form of hard, dry granules, equivalent in amount to that produced by the added acid and ammonia, and of desired product size range, is obtained from a sizing operation. The fines together with the crushed oversize from the sizing operation are returned to the drum. Further operating details are as follows:

| | |
|---|---|
| Concentration of acid | 48.4% $P_2O_5$. |
| Rate of acid addition | 8.5 lbs./hr. |
| Rate of granule recirculation | 4,500 lbs./hr. |
| Production rate | 7.5 lbs./hr. |
| Recycle ratio | 600:1. |
| Product size | 5–12 B.S. mesh sieve. |
| Product moisture | 0.10% $H_2O$. |
| Bed temperature | 115° C. |
| Granule moisture content at point of acid addition | 0.11% $H_2O$. |

*Example 2*

Granular fertiliser-grade monoammonium phosphate is made as follows in the double drum reactor illustrated in FIGURE 2 hereinbefore described. The drums 3 and 4 are 4 ft. long x 1¾ ft. diameter and 5 ft. long x 3½ ft. diameter respectively and the outer drum 4 is fitted with six lifting cups each of total discharge capacity of approximately 1 lb. The granulator is rotated at 32 r.p.m. Wet-process phosphoric acid is added through pipe 1 to the bed 3a of preformed circulating grandules. The acid-coated granules are reacted with gaseous ammonia fed through pipe 2 at the rate necessary to ammoniate the acid to monoammonium phosphate. The rotation of the granulator carries the granules around the granulator and back to the acidification point as hereinbefore described. An amount of the bed of granules is extracted through the bifurcation in the chute 8 and subjected to a sizing operation. Product in the form of hard, dry granules of desired product size range is removed from the sizing operation in an amout equivalent to that produced by the added acid and ammonia. Fines and crushed oversize from the sizing operation are returned to the drum. Further operating details are as follows:

| | |
|---|---|
| Concentration of acid | 48.4% $P_2O_5$. |
| Rate of acid addition | 176 lbs./hr. |
| Rate of granule recirculation | 12,000 lbs./hr. |
| Production rate | 160 lbs./hr. |
| Recycle ratio | 75:1. |
| Product size | 5–12 mesh B.S. sieve. |
| Product moisture | 0.1% $H_2O$. |
| Bed temperature | 110° C. |
| Granule moisture content at point of acid addition | 0.44% $H_2O$. |

*Example 3*

A more highly ammoniated granular ammonium phosphate ($N:P=1.55$) is produced from wet-process phosphoric acid and anhydrous ammonia in the reactor of FIGURE 2 and following the general procedure of Example 2. The particular operating conditions are as follows:

| | |
|---|---|
| Concentration of acid | 50% $P_2O_5$. |
| Rate of acid addition | 90 lbs./hr. |
| Rate of granule recirculation | 12,000 lbs./hr. |
| Production rate | 90 lbs./hr. |
| Recycle ratio | 133:1. |
| Product size | 5–12 mesh B.S. sieve. |
| Product moisture | 0.15% $H_2O$. |
| Bed temperature | 95–100° C. |
| Granule moisture content at point of acid addition | 0.38% $H_2O$. |

*Example 4*

The reactor of FIGURE 1 is used to produce a complete granular fertiliser (containing 23% N, 11½% $P_2O_5$ and 11½% $K_2O$) based on ammonium nitrate, ammonium phosphate ($N:P=1.0$) and potassium chloride, a mixed phosphoric-nitric acid feed being used. The solid potassium chloride is added through a chute, not illustrated in FIGURE 1, to a point on the rolling bed immediately preceding that point where the ammonia is introduced. The general procedure followed is that of Example 1. The particular operating conditions are as follows:

| | |
|---|---|
| Concentration of mixed acid feed | 13.9% $P_2O_5$, 55.0% $HNO_3$. |
| Rate of acid addition | 4.2 lbs./hr. |
| Rate of potassium chloride addition | 1.0 lbs./hr. |
| Rate of granule recirculation | 4,500 lbs./hr. |
| Production rate | 5.0 lbs./hr. |
| Recycle ratio | 900:1. |
| Product size | 5–12 mesh B.S. sieve. |
| Product moisture | 0.3% $H_2O$. |
| Bed temperature | 90–95° C. |
| Granule moisture content at point of acid addition | 0.32% $H_2O$. |

The bed temperature is controlled by the rate of addition of the reactants to prevent the formation of oversize because the granules become plastic above that temperature.

*Example 5*

As an illustration of the process of the invention in which two separate acid feeds are used, a complete granular fertiliser (containing 12% N, 12% $P_2O_5$, and 18% $K_2O$) based on ammonium sulphate, ammonium phosphate ($N:P=1.0$) and potassium chloride is made in a reactor as illustrated in FIGURE 2 with phosphoric acid being added to the bed 3a, in the inner drum 3, through pipe 1, and being ammoniated with gaseous ammonia introduced through pipe 2 in the manner described, but with sulphuric acid being added to the bed 4a, in the outer drum 4, through a pipe, not illustrated in the figure, fixed through end plate 4c. Ammonia is injected into the bed 4a, near the sulphuric acid inlet pipe in such proportions as to form ammonium sulphate ($NH_4)_2SO_4$. The solid potassium chloride is added through a chute, not illustrated in FIGURE 2, which passes through the stationary end plate 4b. The general procedure followed is that of Example 2. The particular operating conditions are as follows:

| | |
|---|---|
| Concentration of phosphoric acid feed | 45% $P_2O_5$. |
| Concentration of sulphuric acid feed | 94% $H_2SO_4$. |
| Rate of phosphoric acid addition | 48 lbs./hr. |
| Rate of sulphuric acid addition | 61 lbs./hr. |
| Rate of potassium chloride addition | 55 lbs./hr. |
| Rate of granule recirculation | 12,000 lbs./hr. |
| Production rate | 180 lbs./hr. |
| Recycle ratio | 67:1. |
| Product size | 5–12 mesh B.S. sieve. |
| Product moisture | 0.1% $H_2O$. |
| Bed temperature | 100–110° C. |
| Granule moisture content at point of phosphoric acid addition | 0.25% $H_2O$. |

*Example 6*

It is not necessary to form all the ammonium salts in situ, so long as the heat of reaction of those which are formed in adequate. For example, the three following runs illustrate how a granular ammonium nitrate-ammonium sulphate composition is made in the granulator illustrated in FIGURE 2, using varying amounts of solid ammonium sulphate as a raw material. The nitric acid is added in a similar manner to the sulphuric acid in Example 5, and the phosphoric acid of Example 5 is replaced by sulphuric acid. Ammonia is introduced into the beds 3a and 4a as in Example 5. The solid ammonium sulphate is added in the manner described for the potassium chloride in Example 4.

The particular operating conditions are as follows:

| | Run A | Run B | Run C |
|---|---|---|---|
| Concentration of nitric acid feed (percent $HNO_3$) | 90 | 90 | 90 |
| Concentration of sulphuric acid feed (percent $H_2SO_4$) | 94 | 94 | |
| Rate of nitric acid feed (lb./hr) | 25½ | 35 | 31 |
| Rate of sulphuric acid feed (lb./hr) | 41½ | 27 | |
| Rate of solid ammonium sulphate addition (lb./hr) | | 38 | 72 |
| Rate of granule recirculation (lb./hr) | 12,000 | 12,000 | 12,000 |
| Production rate (lb./hr) | 82 | 112 | 112 |
| Recycle ratio | 146:1 | 107:1 | 107:1 |
| Product size (mesh B.S. sieve) | 5–12 | 5–12 | 5–12 |
| Product moisture (percent $H_2O$) | 0.2 | 0.2 | 0.2 |
| Bed temperature (° C.) | 90–100 | 85 | 85 |
| Granule moisture content at point of nitric acid addition (percent $H_2O$) | 0.22 | 0.23 | 0.23 |

What I claim is:

1. A continuous process for the production of a multi-layered granular ammonium salt fertiliser which comprises providing quantities of ammonia and at least one acid selected from the group consisting of phosphoric acid, sulphuric acid and nitric acid, reacting said quantities of ammonia and acid on granules comprising ammonium salt in a localized region of a reaction chamber while maintaining the moisture content of said granules therein at a level below about 1% thereby forming a layer of ammonium salt on each of said granules, withdrawing all of said granules from said localized region of said reaction chamber and transferring same to a second region in said reaction chamber remote from said localized region, removing a portion of said granules from said second region of said reaction chamber and in an amount greater than the amount of the acid and ammonia being added to said localized region of said chamber and then sizing said removed granules to obtain a desired product size range, returning the remainder of the granules from said sizing operation to said chamber recirculating within said chamber the remainder of said granules from said second region to said localized region while maintaining the moisture content of the recirculating granules at a level below 1%, the ratio of the rate of recirculation to the rate of obtaining the product being at least 20:1, reacting in said localized region said recirculated granules with additional quantity of ammonia and acid while continuing to maintain the moisture content of said granules in said localized region at a level below 1% thereby forming a further layer of ammonium salt thereon, and repeating said removal, sizing and recirculation cycle to obtain a multi-layer granular ammonium salt fertiliser as the end product.

2. A process as claimed in claim 1 wherein the moisture content of the granules is at least 0.1% less than that at which the granules tend to lose their discrete identities at the temperature of said moving granules.

3. A process as claimed in claim 1 wherein the granules are treated with a reactant selected from said acid and ammonia in more than one localized region of said moving granules per cycle.

4. A process as claimed in claim 1 wherein said ratio is at least 60:1.

5. A process as claimed in claim 1 wherein the recirculation of the moving stream of granules is effected by removing granules from one part of a moving bed of granules and transferring them to another part of the same bed in a reactor comprising a single drum rotating about a substantially horizontal axis and having means to effect during its rotation internal recirculation of granules from one end portion of the reactor to the other.

6. A process as claimed in claim 1 wherein the recirculation of the moving stream of granules is effected by removing granules from one part of a moving bed and transferring them to another moving bed from which they are transferred to the first bed in a reactor comprising two drums, concentrically mounted one within the other and rotating about a substantially horizontal axis, and having means to effect during its rotation internal recirculation of granules from one end portion of the reactor to the other.

References Cited by the Examiner

UNITED STATES PATENTS 2,600,253   6/1952   Lutz _____ 71—64

DONALL H. SYLVESTER, *Primary Examiner.*